US012708136B2

(12) United States Patent
Bondu et al.

(10) Patent No.: US 12,708,136 B2
(45) Date of Patent: Aug. 18, 2026

(54) SUPPORTED NICOTINE COMPOSITION

(71) Applicant: Zanoprima Lifesciences Limited, London (GB)

(72) Inventors: Vinod Kumar Reddy Bondu, London (GB); Raymond McCague, London (GB); William Jackson, London (GB); George Cassels-Smith, London (GB); Ashok Srinivasan Narasimhan, London (GB)

(73) Assignee: Zanoprima Lifesciences Limited, London (GB)

( * ) Notice: Subject to any disclaimer, the term of this patent is extended or adjusted under 35 U.S.C. 154(b) by 379 days.

(21) Appl. No.: 18/286,925

(22) PCT Filed: Apr. 8, 2022

(86) PCT No.: PCT/GB2022/050893

§ 371 (c)(1),
(2) Date: Oct. 13, 2023

(87) PCT Pub. No.: WO2022/219310

PCT Pub. Date: Oct. 20, 2022

(65) Prior Publication Data

US 2024/0188620 A1 Jun. 13, 2024

(30) Foreign Application Priority Data

Apr. 14, 2021 (GB) .................................... 2105305

(51) Int. Cl.

| | |
|---|---|
| ***A24B 15/16*** | (2020.01) |
| ***A23G 4/06*** | (2006.01) |
| ***A23G 4/12*** | (2006.01) |
| ***A24B 13/00*** | (2006.01) |
| ***A24B 15/32*** | (2006.01) |
| ***A24B 15/42*** | (2006.01) |

(52) U.S. Cl.
CPC .............. *A24B 15/16* (2013.01); *A23G 4/064* (2013.01); *A23G 4/126* (2013.01); *A24B 13/00* (2013.01); *A24B 15/32* (2013.01); *A24B 15/42* (2013.01)

(58) Field of Classification Search
CPC ......... A24B 15/16; A24B 13/00; A24B 15/32; A24B 15/42; A23G 4/064; A23G 4/126
See application file for complete search history.

(56) References Cited

U.S. PATENT DOCUMENTS

| | | | | |
|---|---|---|---|---|
| 2003/0119879 | A1 | 6/2003 | Landh et al. | |
| 2004/0037879 | A1* | 2/2004 | Adusumilli | A61P 25/24 424/468 |
| 2005/0123489 | A1 | 6/2005 | Cherukuri et al. | |
| 2008/0131508 | A1 | 6/2008 | Agarwal et al. | |
| 2009/0004281 | A1 | 1/2009 | Nghiem et al. | |
| 2009/0196834 | A1* | 8/2009 | Andersen | A61K 45/06 424/48 |
| 2010/0326454 | A1* | 12/2010 | Fuisz | A24B 13/00 131/300 |
| 2011/0129517 | A1 | 6/2011 | Rudolph et al. | |
| 2014/0246033 | A1 | 9/2014 | Daehne et al. | |
| 2017/0196256 | A1 | 7/2017 | Holton, Jr. | |
| 2018/0084820 | A1 | 3/2018 | Fuisz | |
| 2019/0174812 | A1* | 6/2019 | Nielsen | A61K 9/0056 |

FOREIGN PATENT DOCUMENTS

| | | | |
|---|---|---|---|
| AU | 2014202362 | B2 | 7/2016 |
| CN | 111213902 | A | 6/2020 |
| GB | 1319861 | A | 6/1973 |
| GB | 2016897 | A | 10/1979 |
| JP | S47-3750 | A | 2/1972 |
| JP | 2012531898 | A | 12/2012 |
| JP | 2014509645 | A | 4/2014 |
| JP | 2019515700 | A | 6/2019 |
| WO | 2019/110075 | A1 | 6/2019 |
| WO | 2020/084024 | A1 | 4/2020 |

OTHER PUBLICATIONS

International Search Report for International Application No. PCT/GB2022/050893 mailed Jul. 11, 2022.

Tomita Pharmaceutical Co., Ltd., 2018, “Florite”, tomitaph.co.jp, [online], Available from: http://www.tomitaph.co.jp/english/data/FLORITE.pdf [Accessed May 13, 2021].

* cited by examiner

*Primary Examiner* — Christopher M Rodd
*Assistant Examiner* — Jennifer A Kessie
(74) *Attorney, Agent, or Firm* — Morse, Barnes-Brown & Pendleton, P.C.; Stanley F. Chalvire, Esq.

(57) ABSTRACT

The present invention relates to a composition comprising nicotine and/or nicotine salt, and calcium silicate, wherein the composition is in a pouch, wherein the pouch is intended to be placed in the mouth.

14 Claims, No Drawings

SUPPORTED NICOTINE COMPOSITION

CROSS-REFERENCE TO RELATED APPLICATIONS

This application is a national stage filing under 35 U.S.C. 371 of International Application No. PCT/GB2022/050893, filed Apr. 8, 2022, which claims the benefit of GB Application No. 2105305.3, filed on Apr. 14, 2021, the contents of which are hereby incorporated by reference in their entirety. International Application No. PCT/GB2022/050893 was published under PCT Article 21(2) in English.

The present invention relates to particular compositions comprising nicotine and calcium silicate in particular to provide a supported composition of nicotine and their uses.

There is a demand for nicotine products, principally for tobacco replacement. For this purpose, a suitable formulation of the nicotine has to be identified, and in this regard several criteria should ideally be met. First, the nicotine should be released with a particular profile, and in the case of products for oral administration or inhalation of vapour, should be to provide the best user experience possible. Typically, this will involve a quick release of nicotine from the formulation to provide an immediate pleasurable 'hit' followed by a sustained period of delivery to prolong the experience. Further, nicotine itself is an oily liquid which is difficult to handle, store and formulate so generally needs some diluent or support in order to physically accommodate the composition into the vehicle used for its administration. Furthermore, nicotine is prone to oxidative degradation, so the supported form should show improved stability. In addition, the composition should be able to accommodate other materials that are beneficial to its use; for example the incorporation of certain flavour ingredients.

The above mentioned properties can be met by means of a support material for the nicotine, many examples of which are known in the art. For example, nicotine supported on an ion exchange resin (Polacrilex) is a commercial product used in gums and hard lozenges for buccal delivery of the nicotine. The use of microcrystalline cellulose and/or compressible sugar-alcohol particles to provide a support for a chewable orally disintegrating tablet releasing nicotine has also previously been described. Alternatively, solid lipid particles can be used as a support in a nicotine powder composition. Further, an inorganic mineral filler material acting as a support based on natural or precipitated calcium carbonate to provide a nicotine containing chewing gum or particulate material for controlled release has previously been disclosed. However, in general, the supports described in the prior art are only suitable for oral administration products. Often manufacturers provide their nicotine replacement products in various forms and, therefore, manufacturers have to use different nicotine powder compositions for their various products thereby increasing manufacturing costs.

A known formulation for nicotine, for example, for use in pouches or lozenges is comprised of a mixture of a tartrate or such other salt of nicotine and a base such as sodium hydrogen carbonate, which releases the free nicotine upon reaction with water. However, this can undesirably result in a salty taste and the ingestion of the large amounts of sodium salts which can have an effect on the user's blood pressure.

It is, therefore, an object of the present invention to seek to alleviate the above identified problems.

SUMMARY OF THE INVENTION

According to one aspect of the present invention, there is provided a composition comprising nicotine and/or nicotine salt and calcium silicate.

According to another aspect of the present invention, there is provided a composition comprising nicotine and/or nicotine salt, and calcium silicate, wherein the composition is in a pouch, wherein the pouch is intended to be placed in the mouth.

According to another aspect of the present invention, there is provided a premix composition comprising calcium silicate in a range of about 5 wt % to about 70 wt % calcium silicate and nicotine in a range of about 5 wt % to about 70 wt %, wherein the amount of nicotine is present as nicotine and/or an equivalent amount of nicotine provided as a nicotine salt.

According to another aspect of the present invention, there is provided a formulation comprising the premix as described herein, wherein the formulation comprises about 0.05 wt % to about 5 wt % nicotine, wherein the amount of nicotine is present as nicotine and/or an equivalent amount of nicotine provided as a nicotine salt.

According to another aspect of the present invention, there is provided a formulation comprising the premix as described herein, wherein the formulation comprises about 0.07 wt % to about 15 wt % of the premix composition, preferably about 0.1 wt % to about 10 wt %.

According to another aspect of the present invention, there is provided a lozenge comprising the composition, premix composition or formulation according to the present invention herein described.

According to another aspect of the present invention, there is provided a chewing gum comprising the composition, premix composition or formulation according to the present invention herein described.

According to another aspect of the present invention, there is provided a tablet comprising the composition, premix composition or formulation according to the present invention herein described.

According to another aspect of the present invention, there is provided a heat-not-burn product comprising the composition, premix composition or formulation according to the present invention herein described.

According to another aspect of the present invention, there is provided a pouch comprising the composition, premix composition or formulation according to the present invention herein described.

According to another aspect of the invention there is provided a method for preparing a composition, premix composition or formulation according to the present invention, the method comprising mixing nicotine and/or a nicotine salt with calcium silicate.

According to another aspect of the invention there is provided a method for preparing a composition, premix composition or formulation, the method comprising pretreating calcium silicate with carbon dioxide before mixing with nicotine and/or a nicotine salt.

According to another aspect of the invention there is provided a method for preparing a composition, premix composition or formulation, the method comprising mixing calcium silicate, water, and nicotine and/or a nicotine salt.

According to another aspect of the invention there is provided a method for preparing a composition, premix composition or formulation, the method comprising mixing calcium silicate with carbon dioxide and nicotine and/or a nicotine salt.

DETAILED DESCRIPTION

The present invention firstly relates to a composition comprising nicotine and/or nicotine salt and calcium silicate, wherein the composition is in a pouch, wherein the pouch is intended to be placed in the mouth.

It has been found that calcium silicate provides a useful support for nicotine suitable both for compositions for oral administration and for use in an inhalation device. The support is effective, both to bring the nicotine from an oil into an easily handled solid powder formulation, and to provide a medium from which the nicotine is readily released to the user.

Further, the use of calcium silicate as a support allows for additional ingredients to be used with the composition, for example, flavours and other ingredients required to enhance the user's experience.

Further, no additional base such as sodium hydrogen carbonate is needed and, therefore, there is no ingestion of large amounts of sodium salts while ingesting the nicotine.

Compositions containing both calcium silicate and nicotine have been described in the prior art. However, the purpose of the calcium silicate in the prior art formulations was not to support the nicotine but rather to improve the physical properties of the resulting composition, such as to improve the flow properties. For the purpose used in the prior art, the calcium silicate has generally being used as a low percentage, but the purpose of providing a supported form of nicotine, the calcium silicate is at a higher percentage. Moreover, calcium silicate has not been used in the prior art in a pouch formulation for the nicotine. Likewise, for the purposes in the prior art nicotine is present in the compositions at a low percentage, whereas in regard to this invention for the purpose of providing a supported form of nicotine, and in particular to provide a premix, the nicotine is at a higher percentage.

R. C. Fuisz, Patent Application US2018/0084820 concerns fully dissolvable spitless melt-spun compositions with 1-70% tobacco content. Given that the nicotine content in tobacco is typically around 1%, their compositions are generally less than 1% nicotine content. Although their compositions contain calcium silicate, its purpose is to promote flowability of the compositional blend for uniform processing, and their application specifies only up to 10% and preferably 3-5% of this. Their examples show calcium silicate in the range of 2-4%. Aside from the relatively low proportions of nicotine and calcium silicate present, their compositions are designed to be fully soluble in the mouth without spit and thus being distinctly different from the pouch compositions in the present invention.

Similarly, R. C. Fuisz, Australian Patent AU2014/202362B2 concerns a sheet non-aqueous extrudable composition containing a thermoplastic polymer to deliver a bioactive product such as nicotine by placing in contact with the mucosa of the user. They refer to compositions with a total tobacco amount of 75 mg. Given that tobacco contains about 1% nicotine that would suggest these compositions contain about 0.75 mg nicotine. Separately, typical examples in the patent contain 25% tobacco; that would imply about 0.25% nicotine. Although certain of their compositions include calcium silicate, its purpose is as a flow agent to promote flowability and resulting evenness and uniformity of the finished product. As such it is only used in relatively small amounts with examples in the range of 2-6%. While they do not explicitly describe a composition containing both nicotine and calcium silicate, they do describe a composition with nicotine and starch with an indication that a silicate can replace the starch. Nonetheless, aside from the relatively low proportions of nicotine and calcium silicate in their composition, their compositions are designed to dissolve directly by contact with the oral mucosa of the user. They do not employ a pouch that would be placed in the mouth to contain the formulation; indeed such would prevent the direct contact of their composition with the oral mucosa that they require. While they mention their composition could be within a pouch, they only refer to a pouch that would be used as a packaging embodiment, the composition to be removed by the user from the pouch for use; such pouch would not be saliva-permeable and is not intended to be placed in the mouth. Notably they compare their product to the Snus type product of others, notably that their composition with 75 mg tobacco creates a greater plasma nicotine content than a Snus type product containing 2 mg nicotine and thus is superior. The Snus type products of other companies use saliva permeable pouches. Given they state their product is superior, in effect teaches away from a concept of using their extrudable composition within a saliva permeable pouch.

R. G. Bayless et al, Patent Application GB2016897A concerns a combustible tobacco substitute smoking material comprising nicotine encapsulated into a combustible polysaccharide material and that may then be combined with a particulate organic filler. An example indicates about 2.2. parts of microencapsulated nicotine citrate of about 20% nicotine within about 75 g of other ingredients such as filler. It will be evident that the proportion of nicotine in the entire composition is less than 1%, so to be similar in that regard to tobacco. As possible filler materials they list the possible combination of any of 14 cations with 9 anions, and within that a preference for 6 cations, one of which is 'calcium' and 8 anions, one of which is 'silicates'; however silicate is not one of the 3 most preferred anions. Moreover their list of specific filler materials includes sodium silicate, calcium aluminate and calcium carbonate, and it can be presumed that they did not specifically look at calcium silicate and therefore would not know what particular properties it might impart on their resulting composition. Moreover, the design of their composition is to encapsulate the nicotine within polysaccharide and thereby the filler is kept separate from the nicotine, and there is what amounts to a premix of nicotine and polysaccharide only, that is later mixed with filler material according to their description. Furthermore the compositions given are only for the purpose of a combustible tobacco substitute for smoking; there is no way to know how the inorganic materials might perform in other types of formulation for nicotine administration, such as a pouch intended to be placed in the mouth.

L Daehne et al, US Patent Application 2014/0246033 describes a heat-not-burn system wherein the device contains a depot in which the nicotine is adsorbed within nanoparticles of a material such as glass, silicates or aluminium silicate, and the depot has a macroporous structure allowing air flow through it so when a region of the depot is heated, the vaporised nicotine is released into the air flow for the user to inhale. However, while the description mentions 'silicates' it does not exemplify any use of calcium silicate. Their focus is towards aluminium trisilicate. Moreover, their application is only concerned with a heat-not-burn device as a means to create a vapour stream containing nicotine. It provides no information that could translate to utility in other forms of nicotine delivery, and in particular there is nothing is their application to suggest any utility of silicates in compositions that are taken into the mouth, and the effectiveness where release of the nicotine is caused due to ingress of saliva as opposed to heating the solid. One comment in their application is that nicotine present in the nanoporous particles is more stable; however our observations with calcium silicate suggest that nicotine so adsorbed is not very stable against oxidative degradation, and in order to improve its stability, other stabilising agents should be added such as water, glycerol, carbon dioxide or ethanol as discussed below. This may reflect a difference in behaviour between the types of silicate referred to in their invention, with the calcium silicate used in the present invention. Also with regard to a formulation for pouches intended to be placed in the mouth, such as those permeable to saliva, quite different properties are required. It is undesirable to use aluminium silicates for a composition placed in the mouth due to toxicity.

Examples of calcium silicate suitable for use in the present invention are (i) Florite® PS-200 of Tomita Pharmaceutical Co Ltd, Tokushima, Japan, (ii) Florite® R, also of Tomita, (iii) Zeofree® 250 Precipitated Calcium Silicate NF by Evonik Resource Efficiency GmbH, Hanau-Wolfgang, Germany, and (iv) 'Hydrated Calcium Silicate BP/USP' of MLA Industries, Kanpur, India.

A preferred form of calcium silicate for use in the present invention is the synthetic calcium silicate marketed by Tomita Pharmaceutical with the brand name Florite®. Florite® has a relatively open structure compared to other known calcium silicates which allows a significant amount of nicotine/nicotine salt to be adsorbed. However, for the purposes of the present invention any form of calcium silicate may be used.

Preferably, the pouch is a saliva-permeable pouch. This aids the release of the nicotine from the pouch as nicotine is water soluble.

Preferably, the pouch is a heat-sealable pouch, preferably a heat-sealable non-woven pouch. Such a pouch allows saliva to pass through the pouch to the nicotine quickly, as the pouch does not need to dissolve for the nicotine to be accessible in the mouth.

Preferably, the pouch has a width in the range of about 8 mm to about 20 mm, preferably about 10 mm to about 16 mm, such as about 14 mm. Preferably, the pouch has a length in the range of about 20 mm to about 40 mm. preferably about 25 mm to about 35 mm, such as about 30 mm. Such sizes are advantageous for placing the pouch in the mouth, such as between the cheek and gum or between the lip and gum.

Preferably, the pouch is intended to be placed in the mouth between the cheek and the gum and/or between the lip and the gum, preferably between the cheek and the gum. This is a suitable position for absorption of nicotine from the pouch into the body.

Preferably, the composition in the pouch comprises calcium silicate in a range of about 0.5 wt % to about 4 wt % calcium silicate and nicotine in a range of about 0.5 wt % to about 2 wt %, wherein the amount of nicotine is present as nicotine and/or an equivalent amount of nicotine provided as a nicotine salt. This is a suitable amount for stabilisation of nicotine by the calcium silicate and absorption of nicotine into the mouth.

Preferably, the pouch comprises about 100 mg to about 500 mg of the composition, preferably wherein the pouch comprises about 200 mg to about 400 mg of the composition. Such amounts mean the pouch and composition have a suitable size for delivering nicotine to the mouth of a user.

Preferably the composition is for use in a tobacco replacement product. The composition and premix composition of the present invention allows nicotine to be used in any tobacco replacement product in which it is possible to use a powder, for example, a heat-not-burn devices, lozenges, tablets, pouches and/or chewing gum.

Preferably the nicotine is selected from either synthetic nicotine or nicotine extracted from tobacco. Preferably the nicotine salt is formed from either synthetic nicotine or nicotine extracted from tobacco. Synthetic nicotine is purer than nicotine extracted from tobacco but both can be used in the present composition. The present composition may contain only synthetic nicotine, only nicotine extracted from tobacco or a mixture of both.

Preferably the ratio of, nicotine/nicotine salt to calcium silicate by weight is in the range of about 5% to about 95% to about 75%:to about 25%. The term "nicotine/nicotine salt" means nicotine and/or nicotine salt.

Preferably, the amount of nicotine is present as nicotine and/or an equivalent amount of nicotine provided as a nicotine salt.

Preferably, the ratio of nicotine/nicotine salt to calcium silicate by weight is in the range of about 10% to about 90% to about 70% to about 30%.

Preferably, the ratio of nicotine/nicotine salt to calcium silicate by weight is in the range of about 25% to about 75% to about 60% to about 40%.

For avoidance of doubt the ranges mentioned herein are the ranges for use in the raw materials used in the production of the final product. For example, the final blend formulations for the Pouch application may only contain about 0.75% and about 1.5% nicotine by weight.

Further, when calculating the ranges herein ingredients other than those named should be disregarded when considering the ratio. For example, a composition may comprise nicotine, calcium silicate and a flavouring. However, when considering the ratio of nicotine to calcium silicate, the amount of flavouring present should be disregarded.

Preferably the composition is for stabilisation of nicotine in said composition. It has been found that the composition of the present invention stabilises the nicotine and, therefore, can provide an extended shelf-life for any product containing the composition.

The terms "stable", "stabilised", "stabilisation" or any derivative of the word "stable" used herein refer to the nicotine in the composition displaying less decomposition than would nicotine in a composition that does not have an ingredient leading to stabilisation. For example, 'stable' in this context may imply a composition displaying minimal signs of decomposition (for example, less than in the region of 10% nicotine oxidation) for more than 2 months, while a composition that is not so referred may display more than 10% of nicotine oxidation in the same period. Such nicotine oxidation will produce such products of decomposition as myosmine, nicotine-N-oxide and cotinine.

Preferably the composition further comprises either an acid, ethanol, carbon dioxide, glycerol or any combination thereof.

The use of one of these ingredients in the composition of the present invention improves the stability of the nicotine but retains good release of nicotine for the relevant application Preferably the acid is selected from pyruvic acid, benzoic acid, levulinic acid, citric acid, gluconic acid, glucuronic acid, ribonic acid, arabinonic acid or galactonic acid.

Preferably the acid is a hydroxy acid, for example, a sugar acid such as gluconic acid, glucuronic acid, ribonic acid, arabinonic acid and galactonic acid. Preferably, the acid is citric acid or gluconic acid.

Preferably the acid reacts with nicotine to form a nicotine salt. The formation of a nicotine salt may improve the stability of nicotine.

Preferably the composition comprises about 5 to about 70% nicotine/nicotine salt, about 5 to about 70% calcium silicate and about 5 to about 90% acid by weight.

Preferably the composition comprises about 5 to about 65% nicotine/nicotine salt, about 10 to about 60% calcium silicate and about 10 to about 80% acid by weight.

Preferably the composition comprises about 10 to about 55% nicotine/nicotine salt, about 14 to about 50% calcium silicate and about 15 to about 72% acid by weight.

Preferably when the nicotine is loaded onto the calcium silicate at a concentration of about 1 to 20 wt % and the gluconic acid is present (on a 50% aqueous basis) at about 5 to 75 wt %. Preferably when the nicotine is loaded onto the calcium silicate with citric acid, citric acid in present a concentration of up to about 50 wt %.

Preferably the composition comprises about 5 to about 70% nicotine/nicotine salt, about 5 to about 70% calcium silicate and about 5 to about 90% ethanol by weight.

Preferably the composition comprises about 5 to about 65% nicotine/nicotine salt, about 10 to about 60% calcium silicate and about 10 to about 80% ethanol by weight.

Preferably the composition comprises about 10 to about 55% nicotine/nicotine salt, about 14 to about 50% calcium silicate and about 15 to about 72% ethanol by weight.

Preferably the composition comprises about 5 to about 80% nicotine/nicotine salt, about 5 to about 50% calcium silicate and about 5 to about 50% glycerol by weight.

Preferably the composition comprises about 20 to about 65% nicotine/nicotine salt, about 10 to about 40% calcium silicate and about 10 to about 35% glycerol by weight.

Preferably the composition comprises about 30 to about 60% nicotine/nicotine salt, about 10 to about 35% calcium silicate and about 15 to about 25% glycerol by weight.

A composition prepared using glycerol can confer a smooth taste/feel to the product which users can find preferable.

Preferably the ratio of nicotine/nicotine salt to carbon dioxide by weight is in the range of about 90%: 10% to about 50%:50%. The amount of carbon dioxide expressed herein is the amount used to produce the composition, not the amount of carbon dioxide molecules that might result, for example when producing the composition of the present invention, the carbon dioxide is likely to react with calcium silicate to form calcium carbonate and silica, the $CO2$ atoms are still there but not as carbon dioxide. As shown in the examples, the use of carbon dioxide reduces the level of impurities in nicotine.

Preferably, the composition comprises carbon dioxide and glycerol. The glycerol increases the solubility of the carbon dioxide.

Preferably, the composition comprises a powder component and a granule component, wherein the composition is in the form of the powder component and/or the granule component, preferably in the form of the powder component and the granule component. Preferably, the powder component releases nicotine more quickly than the granule component. Preferably, the powder is a free-flowing powder. This has the advantage of providing a fast initial nicotine release, followed by a sustained release of nicotine. It is an advantage of the invention that compositions can be formulated to give the required release profile.

The present invention relates to a premix composition comprising calcium silicate in a range of about 5 wt % to about 70 wt % calcium silicate and nicotine in a range of about 5 wt % to about 70 wt %, wherein the amount of nicotine is present as nicotine and/or an equivalent amount of nicotine provided as a nicotine salt. Such a composition can aid the stabilisation of nicotine and help the release of nicotine into the body. It is an advantage that the premix can be used in a wide range of nicotine products as disclosed herein.

Preferably, the premix composition comprises calcium silicate in a range of about 20 wt % to about 60 wt % calcium silicate and nicotine in a range of about 10 wt % to about 60 wt %, wherein the amount of nicotine is present as nicotine and/or an equivalent amount of nicotine provided as a nicotine salt.

Preferably, the premix composition further comprises carbon dioxide. Using carbon dioxide has been shown to increase the stability of nicotine.

Preferably, the premix composition further comprises water, preferably about 5 wt % to about 30 wt % water, preferably about 10 wt % to about 25 wt % water. Using water has been shown to increase the stability of nicotine.

The present invention relates to a formulation comprising the premix as described herein, wherein the formulation comprises about 0.05 wt % to about 5 wt % nicotine, wherein the amount of nicotine is present as nicotine and/or an equivalent amount of nicotine provided as a nicotine salt, preferably about 0.2 wt % to about 3 wt % nicotine. This shows that the premix can be used to make formulations for end user applications. It is an advantage that the same premix can be used to make different formulations.

The present invention relates to a formulation comprising the premix as described herein, wherein the formulation comprises about 0.07 wt % to about 15 wt % of the premix composition, preferably about 0.1 wt % to about 10 wt %.

The features of the composition described herein, preferably also relate to the premix and the formulation.

A premix composition prepared using ethanol is preferable for producing formulations for chewing gums and lozenges. Such a composition is also useful in heat-not-burn devices. If present the ethanol taste can be satisfying, and/or it can assist with the making of the formulation, by partially dissolving some of the excipients to meld the composition together. If necessary, the ethanol can be removed by evaporation when preparing the final formulation.

Preferably, the premix composition is used for a heat-not-burn product. Unlike other electronic nicotine delivery systems a heat not burn product requires a solid composition that is heated and the nicotine is released to provide a vapour stream. Accordingly, the present composition is useful in heat no burn devices as it is in a powder format. For this purpose, it is useful that upon heating, components of the composition do not undergo decomposition to form impurities in the vapour that could be harmful or otherwise impair the user experience. In this respect, by the use of inorganic material as the support, i.e. calcium silicate or calcium carbonate, organic impurities are not released into the vapour.

The compositions, premix compositions or formulations of the present inventions are useful in heat-not-burn devices as a means to release nicotine vapour upon heating to be inhaled by the user.

Preferably the composition, premix compositions or formulations is for use in a patch, pouch, a lozenge, a tablet or a chewing gum.

The compositions, premix compositions and formulations of this invention were found to not to appreciably discolour over time. A problem with some compositions of the prior art is that when they discolour, it shows through the fabric of the pouch, and that discourages use. The problem has prompted development of coloured pouches that hide the composition within. But with the compositions of this invention, white translucent pouches can be used.

The patch, pouch, a lozenge, a tablet or a chewing gum may comprise the composition, premix composition or formulation according to the present invention in free-flowing powder and/or granulated form. If both the free-flowing powder and the granulated form are present then the free-flowing powder will provide the initial nicotine hit and, thereafter, there is a slow release of nicotine from the granules.

Granulated form can be produced by any method known to a person skilled in the art. An example of such a method is mixing the free-flowing powder produced by the method of the present invention with microcrystalline cellulose and hydroxypropyl cellulose and/or hydroxypropyl methyl cellulose. Making such a granulated form can alter the release profile of the nicotine as required.

The present invention relates to a patch, pouch, lozenge, chewing gum and/or a tablet comprising the composition, premix composition or formulation according to the present invention herein described.

The present composition or premix composition can be used in a variety of products which means that a manufacturer only needs to produce a single formulation as a raw product which may cut manufacturing costs.

The chewing gum described herein preferably further comprises a gum base, a diluent, a glidant, a flavour, a sweetener, a lubricant, a binder, a plasticizer, a solvent, a sugar coating, a colouring agent, a surface polisher or a combination of two or more thereof, preferably gum base granules, sorbitol, colloidal silicon dioxide, a flavour, a sweetener, acesulfame potassium, HPMC, sucralose, polysorbate 80, xylitol, gum *arabica*, titanium dioxide, carnauba wax, or a combination of two or more thereof.

A pouch is typically placed between the cheek and the gum and the nicotine released is absorbed through the oral mucosa providing a direct route to the bloodstream once the nicotine is released. Lozenges and gums may be placed similarly or moved around the mouth. Compositions, premix compositions and formulations of the present invention provide a favourable release profile for pouches, lozenges, tablets and chewing gums as they provide an immediate release of nicotine followed by a sustained release.

The present invention relates to a heat-not-burn product comprising the composition, premix composition or formulation according to the present invention herein described. Another means of providing nicotine as tobacco replacement is by means of a vapour containing nicotine from a suitable device. The composition, premix composition or formulation of the present invention can be used in any suitable device including e-cigarettes and heat-not-burn products. Usually heat-not-burn products contain tobacco but by using the present composition heat-not-burn technology can deliver nicotine to the user without the use of tobacco.

Within this specification embodiments have been described in a way which enables a clear and concise specification to be written, but it is intended and will be appreciated that embodiments may be variously combined or separated without parting from the invention.

Within this specification, the term "about" means plus or minus 20%, more preferably plus or minus 10%, even more preferably plus or minus 5%, most preferably plus or minus 2%.

The compositions may also contain conventional additives, such as stabilizers, wetting agents, emulsifiers, flavouring agents, buffers, and the like.

Liquid formulations may be prepared by dissolving or suspending the active substance in water or other suitable vehicles. Tablets and granules may be coated in a conventional manner.

For oral administration, the compositions can be in the form of soft gelatin capsules or tablets and will usually include an inert diluent or an edible carrier. Compatible binding agents, and/or adjuvant materials can be included as part of the composition. Tablets, lozenges, pills, capsules, troches, pouches and the like can contain any of the following ingredients, or compounds of a similar nature: a binder such as microcrystalline cellulose, gum tragacanth or gelatin; an excipient such as starch, lactose, maltitol, gum *Arabica*; a disintegrating agent such as alginic acid, Primogel, or corn starch; a lubricant such as magnesium stearate or Sterotes; a glidant such as colloidal silicon dioxide; a sweetening agent such as sucrose, saccharin or acesulfame potassium sweetener; or a flavouring agent such as peppermint, methyl salicylate, or orange flavouring. In addition or alternatively, the composition may comprise glycerol to regulate smooth release in the mouth, and/or a binding or coating to the powder otherwise obtained to improve the physical properties, release profile of the nicotine or stability of the contained nicotine.

Compositions containing the appropriately formulated compound can be included in a container, pack, or dispenser together with instructions for administration.

According to another aspect of the invention there is provided a method for preparing a composition or premix composition as herein described, the method comprising mixing nicotine and/or a nicotine salt with calcium silicate. Preferably, the method is for the preparation of stabilised nicotine.

Preferably the method further comprises mixing the nicotine and/or a nicotine salt with an acid, ethanol, carbon dioxide, glycerol or a combination thereof to form a solution before mixing the solution with the calcium silicate.

Preferably when the method uses ethanol, the method further comprises the step of evaporating the ethanol after the mixing step.

Preferably the solution is homogenous before mixing with calcium silicate.

Preferably the solution is introduced to the calcium silicate incrementally. Alternatively, the calcium silicate can be introduced incrementally to the solution.

Preferably mixing continues until a free flowing powder is prepared.

The free flowing powder can be used in a variety of applications/devices/products.

The free flowing powder can be made into granule form by any method known to a person skilled in the art. An example of such a method is mixing the free-flowing powder produced by the method of the present invention with microcrystalline cellulose and hydroxypropyl cellulose and/or hydroxypropyl methyl cellulose.

According to another aspect of the invention there is provided a method for preparing a nicotine composition, the method comprising pre-treating calcium silicate with carbon dioxide before mixing with nicotine and/or a nicotine salt.

According to another aspect of the invention there is provided a method for preparing a composition, premix composition or formulation, the method comprising mixing calcium silicate, water, and nicotine and/or a nicotine salt, preferably wherein the composition, premix composition or formulation comprises about 5 wt % to about 30 wt % water, preferably about 10 wt % to about 25 wt % water. Preferably, the calcium silicate is pre-treated with water dioxide before mixing with nicotine and/or a nicotine salt.

Preferably, the method comprises pre-treating calcium silicate with water and carbon dioxide before mixing with nicotine and/or a nicotine salt, preferably wherein the composition, premix composition or formulation comprises about 5 wt % to about 30 wt % water, preferably about 10 wt % to about 25 wt % water.

According to another aspect of the invention there is provided a method for preparing a nicotine composition, the method comprising mixing calcium silicate with carbon dioxide and nicotine and/or a nicotine salt.

Carbon dioxide can be introduced either with the nicotine in the preparation of the formulation, or the calcium silicate can be pre-treated with carbon dioxide to reduce its alkalinity prior to and separately to the introduction of the nicotine. The carbon dioxide is presumed to react on the surfaces of the calcium silicate support to form calcium carbonate thereby forming a stabilised nicotine composition. In this regard of particular value to the heat-not-burn application is the modulation of the alkalinity of the calcium silicate by means of the introduction of carbon dioxide. The carbon dioxide can also be used as a propellant for the nicotine from the support during use in a heat no burn application. The use of glycerol and/or ethanol can also useful in heat not burn applications as they provide thermally stable compositions.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

Example embodiments of the present invention will now be described. It will be appreciated that the examples below including nicotine and an acid, such as gluconic acid or citric acid preferably result in the in situ formation of a nicotine salt.

Example 1. Nicotine Loading on Calcium Silicate (Florite®) with Gluconic Acid

A free flowing powder was provided by mixing Florite® PS-200 grade (50 g) with nicotine (25 g) and 50% aqueous gluconic acid (125 g), representing 12.5% by weight of nicotine. A one-litre wide-neck container on a balance was used to first weigh in the gluconic acid, the nicotine was added and mixed in. Then the Florite powder was added in portions whilst swirling the container. Finally, the container was capped and the mixture shaken vigorously to complete.

Likewise, a mixture was produced containing Florite® PS-200 grade (25 g), nicotine (25 g) and 50% aqueous gluconic acid (125 g) which represents 14.3% by weight of nicotine but this mixture had a pasty character.

Example 2. Stability of Nicotine Loaded on Calcium Silicate (Florite®) without and with Gluconic Acid Mixtures were prepared of 10%, 20% and 50% by weight of nicotine on Florite® PS-200 grade and on Florite® R-grade.

A mixture of nicotine and 50% aqueous gluconic acid (2 equivs) prepared from 0.25 g nicotine, 1.21 g 50% aqueous gluconic acid and 1.04 g Florite on either Florite® PS-200 or Florite® R-grade having 10% nicotine by weight showed no decomposition of the nicotine after 2 months and after 4 months. In comparison, without the gluconic acid, after three months HPLC analysis with the 20% nicotine sample suggested 10% decomposition with the PS-200 grade and 18% decomposition with the R-grade and the samples became appreciably yellow The nicotine used in these experiments had a starting level of impurity myosmine of 0.14%. After five months, the levels of myosmine were 0.20% and 0.32% when using gluconic acid with PS-200 and R-grade Florite respectively; no other impurities were found. After 6 months, the levels of myosmine were 0.22% and 0.49% when using PS-200 and R-grade Florite respectively, and 0.03% and 0.04% of cotinine respectively while both samples showed 0.02% nicotine-N-oxide.

Example 3. Taste Tests of Nicotine Loaded on Calcium Silicate (Florite®) with Gluconic Acid Taste tests with gluconic acid containing samples from Example 2 revealed a rapid release of the nicotine from the composition. This is in keeping with the dissolution studies (see Example 7).

Example 4. Stability of Nicotine Loaded on Calcium Silicate (Florite®) with Citric Acid A composition was made of 25% w/w nicotine on Florite (PS-200 or R-grade) with 0.5 equivalent citric acid; 4.8 g anhydrous citric acid was mixed with 7.1 g water and 8.1 g nicotine was added. 12.4 g Florite was added and the mixture thoroughly mixed to give a free-flowing powder. The starting level of myosmine impurity was 0.14%. After 2 weeks, the level of myosmine for either grade of Florite was reduced to 0.04% and no impurities were seen. After 5 weeks no degradation of either sample was observable.

Example 5. Preparative Scale Synthesis of Nicotine Loaded onto Calcium Silicate with Gluconic Acid Compositions were made by mixing:

A: (S)-nicotine (synthetic nicotine) (31.25 g, 0.192 mol), gluconic acid (50% aqueous, 156.25 g, 0.398 mol) and calcium silicate (62.5 g, Florite® PS200-grade); and B: (S)-nicotine (50.0 g, 0.308 mol), gluconic acid (50% aqueous, 125.0 g, 0.319 mol) and calcium silicate (75.0 g; Florite® PS200-grade).

These compositions A and B represent 12.5% and 20.0% by weight of nicotine respectively. The nicotine and gluconic acid were mixed until they formed a homogeneous solution and then introduced to the calcium silicate powder over 5 minutes with slow mixing by a planetary mixer, and thereafter mixing continued for 15 minutes resulting in a free-flowing powder which was collected into sealed polybags. The resulting powders showed no discoloration after 15 days of storage. Dissolution studies were carried out by stirring samples in 900 ml pH 7.4 phosphate buffer. Compositions according to formula A released 93.0% and 92.6% of the nicotine after 2 mins, 94.1% and 94.3% after 4 mins, 98.1% and 99.3% after 8 mins. Composition according to formula B released 89.8% of the nicotine after 2 mins, 93.6% after 4 mins and 99.2% after 8 mins.

Example 6. Preparation of Granule Formulation Using Supported Nicotine/Gluconic Acid with Cellulose The premix was composition A (12.5% by weight of nicotine) from Example 5.

Granule formulations were made with the following:

(i) premix (32.0 g), microcrystalline cellulose PH102 (210.5 g), hydroxypropylcellulose (Klucel-LF, 7.5 g);

(ii) premix (16.0 g), microcrystalline cellulose PH102 (226.5 g), hydroxypropylcellulose (HPC; Klucel-LF, 7.5 g);

(iii) premix (32.0 g), microcrystalline cellulose PH102 (209.5 g), hydroxypropyl methyl cellulose (HPMC; low viscosity, 8.75 g);

(iv) premix (24.0 g), microcrystalline cellulose PH102 (340.0 g), hydroxypropyl methyl cellulose (low viscosity, 11.25 g);

(v) premix (48.0 g), microcrystalline cellulose PH102 (319.5 g), hydroxypropyl methyl cellulose (low viscosity, 7.5 g);

(vi) premix (24.0 g), microcrystalline cellulose PH102 (343.5 g), hydroxypropyl methyl cellulose (low viscosity, 7.5 g).

These granular compositions are by weight either 1.6% nicotine (i, iii, v) or 0.8% nicotine (ii, iv, vi). In the preparation procedure, the binder (HPC or HPMC) is made into a 5% w/w solution in purified water and mixed well to obtain a lump free translucent solution. Separately, the quantity of nicotine premix and microcrystalline cellulose were combined with a planetary mixer at a medium speed. Then the binder solution was introduced by means of a peristaltic pump at a rate of 3 to 4 grams per minute, and the mixing continued until consistent granules were obtained. The granules were then sieved to remove any lumps and placed on a tray and dried at 50° C. overnight and packed in a double-lined polybag.

Example 7. Pouch Formulation with Nicotine and Gluconic Acid on Calcium Silicate Granules from Example 6 together with Premix from Example 5 were used to make compositions for pouch formulation according to the amounts in Table 1:

TABLE 1

| Pouch Blend Composition Details (grams) | | | | | | |
|---|---|---|---|---|---|---|
| Nicotine in 400 mg blend | 6 mg | 3 mg | 6 mg | 6 mg | 3 mg | 3 mg |
| Nicotine Granules | 100.00 | 100.00 | 75.00 | 75.00 | 75.00 | 75.00 |
| Nicotine Premix | 6.40 | 3.20 | 4.80 | 4.80 | 2.40 | 2.40 |
| Maltitol | 46.40 | 49.60 | 35.10 | 35.10 | 37.50 | 37.50 |
| Gum arabica | 1.20 | 1.20 | 0.90 | 0.90 | 0.90 | 0.90 |
| Sweetener | 0.40 | 0.40 | 0.30 | 0.30 | 0.30 | 0.30 |
| Citrus* | 5.60 | 5.60 | x | x | x | x |
| Wintergreen* | x | x | 3.90 | x | 3.90 | x |
| Spearmint* | x | x | x | 3.90 | x | 3.90 |
| Final Blend weight | 160.00 | 160.00 | 120.00 | 120.00 | 120.00 | 120.00 |

Flavours are marked in the Table with an asterisk and being in liquid form were first co-processed with the Premix by mixing in. The excipients (maltitol, gum *Arabica* and acesulfame potassium sweetener) were each sifted through a 20-mesh sieve, then the nicotine Premix, granules, the diluents, binder and sweetener in accordance with the above Table are combined in a cone blender mixed for 15 minutes at medium speed. The Premix containing flavours are then added and mixed in for 15 minutes before the final blend is packaged. Dissolution study was made by stirring the final blend in 900 ml pH 7.4 phosphate buffer and HPLC analysis. Samples liberated 89.0%-94.3% of the nicotine after 2 minutes, 92.6%-94.8% after 4 minutes and 95.4-98.3% after 8 minutes. The final blend was finally filled into heat-sealable nonwoven pouches (3.5 cm×1.5 cm) with a dosing unit, pouch filling and sealing machine with a target fill weight per pouch of within 5% of 400 mg of the final blend.

Example 8. Preparative Scale Synthesis of Nicotine Loaded onto Calcium Silicate with Citric Acid Compositions were made by mixing:

A: nicotine (63.1 g, 0.39 mol), anhydrous citric acid (37.4 g, 0.195 mol), water (55.3 g) and calcium silicate (94.2 g, Florite® PS 200 grade) and B: nicotine (100.0 g, 0.62 mol), anhydrous citric acid (30.0 g, 0.156 mol), water (30.0 g) and calcium silicate (60.0 g).

These mixtures are A: 25% and B: 45% by weight of nicotine respectively. The same method was used for the mixing as in Example 5, and the product stored in a sealed polybag. No discoloration was observed after 15 days. Dissolution studies were carried out by stirring samples in 900 ml pH 7.4 phosphate buffer. A composition according to formula A released 96.1% of the nicotine after 2 minutes and 100% of the nicotine after 4 minutes.

Example 9. Preparation of Granule Formulation Using Supported Nicotine/Citric Acid with Cellulose The premix was composition A (25% by weight of nicotine) from Example 8.

Granule formulations were made with the following:

(i) premix (24.0 g), microcrystalline cellulose PH102 (337.9 g), hydroxypropyl methyl cellulose (low viscosity, 13.1 g);

(ii) premix (12.0 g), microcrystalline cellulose PH102 (351.75 g), hydroxypropyl methyl cellulose (low viscosity, 11.25 g).

The resulting nicotine content by weight was (i); 1.6% and (ii) 0.8% respectively. The method of mixing was the same as for Example 6.

Example 10. Pouch Formulation with Nicotine and Citric Acid on Calcium Silicate Granules from Example 9 (either (i) for 6 mg nicotine in 400 mg pouch blend or (ii) for 3 mg) together with Premix (A) from Example 8 were used to make compositions for pouch formulation according to the amounts in Table 2.

TABLE 2

| Pouch Blend Composition Details (Grams) | | | | |
|---|---|---|---|---|
| Nicotine in 400 mg blend | 3 mg | 3 mg | 6 mg | 6 mg |
| Nicotine Granules | 75.00 | 75.00 | 75.00 | 75.00 |
| Nicotine premix | 1.20 | 1.20 | 2.40 | 2.40 |
| Maltitol | 38.70 | 38.70 | 37.5 | 37.5 |
| Gum arabica | 0.9 | 0.9 | 0.9 | 0.9 |
| Sweetener | 0.3 | 0.3 | 0.3 | 0.3 |
| Wintergreen* | 3.90 | x | 3.90 | x |
| Spearmint* | x | 3.90 | x | 3.90 |
| Final blend weight | 120.00 | 120.00 | 120.00 | 120.00 |

The method was as for Example 7. Dissolution release of the contained from the pouch after being stirred in pH 7.4 phosphate buffer (900 ml) after a 2 minute interval was determined by HPLC with a C-18 column as over 85%.

Example 11. Evaluation of Pouches Containing Formulation with Nicotine with Citric Acid on Calcium Silicate for Nicotine Release Evaluation was performed using 5 prototype sample pouches containing 400 mg of blend from Example 10 with 3 mg nicotine content and having wintergreen flavour (first data column of Table in Example 10), noting the nicotine delivery sensation only.

Table 3 gives time intervals in seconds following 'aggressive sucking with slight mastication' to reach the events indicated. The perception was favourable with a sufficiently early initial delivery and duration of nicotine release.

TABLE 3

| (time in s) | | | | |
|---|---|---|---|---|
| Sample | Initial Nicotine Hit | Saturation | Diminished Nicotine | Depleted Nicotine/End |
| 1 | 12 | 48 | 331 | 870 |
| 2 | 7 | 24 | 245 | 470 |
| 3 | 17 | 48 | 248 | 361 |
| 4 | 20 | 30 | 222 | 365 |
| 5 | 12 | 25 | 308 | 411 |

Example 12. Preparative Scale Synthesis of Nicotine Loaded onto Calcium Silicate with Glycerol Compositions were made by mixing:

A: nicotine (18.0 g, 0.11 mol), glycerol (9.0 g, 0.10 mol) and calcium silicate (9.0 g; Florite® R-grade);

B: nicotine (24.0 g, 0.15 mol), glycerol (6.0 g, 0.065 mol) and calcium silicate (10.0 g);

C: nicotine (90.0 g, 0.55 mol), glycerol (45.0 g, 49 mol) and calcium silicate (45.0 g).

These mixtures are A: 50%, B: 60% and C:50% by weight of nicotine respectively. The same method was used for the mixing as in Example 5, and the product stored in a sealed polybag. No discoloration was observed after 15 days. Dissolution studies were carried out by stirring samples in 900 ml pH 7.4 phosphate buffer. A composition according to formula C released 93.0% of the nicotine after 2 minutes. 95.0% after 4 minutes and 99.4% of the nicotine after 8 minutes by HPLC.

Example 13. Preparation of Granule Formulation Using Supported Nicotine/Glycerol with Cellulose The premix was composition C (50% nicotine by weight) from Example 12. Granule formulations were made with the following:

(i) premix (12.0 g), microcrystalline cellulose PH102 (349.9 g), hydroxypropyl methyl cellulose (low viscosity, 13.1 g);

(ii) premix (12.0 g), microcrystalline cellulose PH102 (355.5 g), hydroxypropyl methyl cellulose (low viscosity, 7.5 g).

The nicotine content by weight of the granule formulation was 1.6% for both (i) and (ii). The method of mixing was the same as for Example 6.

Example 14. Pouch Formulation with Nicotine and Glycerol on Calcium Silicate Granules from Example 13 were used to make compositions for pouch formulation according to the amounts in Table 4:

TABLE 4

| Pouch Blend Composition Details (Grams) | | |
|---|---|---|
| Ingredients | 6 mg | 6 mg |
| Nicotine Granules | 100.00 | 75.00 |
| Nicotine premix | 1.60 | 1.20 |
| Maltitol | 51.20 | 38.4 |
| Gum arabica | 1.20 | 0.9 |
| Sweetener | 0.40 | 0.3 |
| Citrus* | x | 4.2 |
| Spicy citrus* | 5.6 | x |
| Final blend weight | 160.00 | 120.00 |

The method was as for Example 7. Dissolution release of the contained from the pouch after being stirred in pH 7.4 phosphate buffer (900 ml) after a 2 minute interval was over 85%.

A user preferred the 6 mg citrus flavour.

Example 15. Preparative Scale Synthesis of Nicotine Loaded onto Calcium Silicate Using Ethanol A composition was made by mixing nicotine (18.0 g, 0.11 mol), ethanol (200.0 g) and calcium silicate (72.0 g; Florite® R-grade). This was 6.0% by weight of nicotine. The calcium silicate was loaded into a planetary mixer and stirred slowly while a solution of the nicotine in the ethanol was introduced by means of a peristaltic pump at a rate of 4 grams per minute. After a further 15 minutes of stirring a homogeneous powder was obtained and collected into sealed polybags. This composition showed no discoloration after 15 days of storage. A dissolution study was carried out by stirring a sample in 900 ml pH 7.4 phosphate buffer. It released 93.9% of the nicotine after 2 minutes. 97.9% after 4 minutes and 98.4% of the nicotine after 8 minutes.

It is envisaged this composition be used in chewing gum and lozenge formulations, and also in heat-not-burn devices, where generally the ethanol may be removed by evaporation as part of creating the final formulation.

Example 16. Characterisation of Nicotine Pouches Blend

The composition of the nicotine pouch blend is shown below in Table 5.

TABLE 5

| Nicotine Pouch Blend composition details (in grams) | | | | |
|---|---|---|---|---|
| Batch | A1 | B1 | C1 | D1 |
| Nicotine strength Per pouch | 6 mg | 6 mg | 6 mg | 6 mg |
| Placebo Granules (Microcrystalline cellulose 147.00 g and Hydroxypropyl methylcellulose (HPMC) (Low viscosity) 3.00 g) | 150.00 | X | 150.00 | X |
| Nicotine premix (gluconic acid and Florite ®) | 48.00 | 48.00 | X | X |
| Nicotine premix (citric acid and Florite ®) | X | X | 24.00 | 24.00 |
| sorbitol | 34.50 | 184.50 | 58.50 | 208.50 |
| Gum arabica | 2.50 | 2.50 | 5.00 | 5.00 |
| Sweetener | 5.00 | 5.00 | 2.50 | 2.50 |
| Cola Mint flavor | 10.00 | 10.00 | 10.00 | 10.00 |
| Final blend weight | 250.00 | 250.00 | 250.00 | 250.00 |

Nicotine premixes comprise nicotine loaded on calcium silicate (Florite®) with either gluconic acid or citric acid respectively.

A binder composition was made by mixing a HPMC with purified water and stirring at 100 RPM to form a lump free translucent solution. A weighed quantity of microcrystalline cellulose was loaded into the planetary mixer and mixed for 15 minutes at medium speed. The translucent solution was added to the planetary mixer using a peristaltic pump with an additional rate of 3 to 4 grams per minute and granulated at medium speed. After granulation, the composition was sieved and placed on a tray and dried at 50° C. overnight. The dried granules were sieved and packed in a double-lined polybag.

A nicotine final blend was made by sifting all the excipients (sorbitol, gum *arabica* and sweetener) separately through 20 mesh and collecting them separately into double-lined polybags. The placebo granules (for batches A and C only), nicotine premix, sifted excipients were placed into a double cone blender, and mixed for 15 minutes at medium speed. The flavor mix was added to the blender and mixed for 15 minutes at medium speed. The final blend was unloaded into double-lined polybags.

The final blend was filled into heat-sealable nonwoven pouches and sealed properly using a suitable dosing unit. The target filled weight per pouch is 250 mg+10%.

Table 6 shows the characterization of Nicotine Pouches Blend. ND means None Detected, BQL means Below Quantifiable Level and LOD means loss on drying. The data shows that the level of nicotine degradants is either not detectable or below a quantifiable level. This shows that nicotine is present in a stabilised form.

TABLE 6

| | Batch | A1 | B1 | C1 | D1 |
|---|---|---|---|---|---|
| Test | pH | 8.02 | 8.18 | 8.5 | 8.26 |
| | LOD (%) | 11.72 | 5.46 | 10.05 | 3.2 |
| | Assay | | 95 to 105% | | |
| | Nicotine degradants | | | | |
| | Anabasine (%) | ND | ND | ND | ND |
| | Anatabine (%) | ND | ND | ND | ND |
| | Beta-Nicotyrine (%) | ND | ND | ND | ND |
| | Cotinine (%) | BQL | BQL | BQL | BQL |
| | Myosmine (%) | BQL | BQL | BQL | BQL |
| | Nicotine N Oxide(%) | BQL | BQL | BQL | BQL |
| | Nornicotine (%) | BQL | BQL | BQL | BQL |

Example 17: Evaluation of Nicotine Pouches with Soluble, Insoluble, and Combination of Diluents with Direct Blending Process The composition of the nicotine pouch blend is shown below in Table 7.

TABLE 7

| Nicotine Pouch Blend composition details (in grams) | | | | | | |
|---|---|---|---|---|---|---|
| Batch | F1 | G1 | H1 | I1 | J1 | K1 |
| Nicotine strength Per pouch | 6 mg | 6 mg | 6 mg | 6 mg | 6 mg | 6 mg |
| Nicotine premix (gluconic acid and Florite ®) | 48.00 | X | 48.00 | X | 48.00 | X |
| Nicotine premix (citric acid and Florite ®) | X | 24.00 | X | 24.00 | X | 24.00 |
| Sorbitol | 174.50 | 198.50 | 0.00 | 0.00 | 139.60 | 158.80 |
| Micro-crystalline cellulose pH 200 | 0.00 | 0.00 | 174.50 | 198.50 | 34.90 | 39.70 |
| Gum arabica | 5.00 | 5.00 | 5.00 | 5.00 | 5.00 | 5.00 |
| Sweetener | 2.50 | 2.50 | 2.50 | 2.50 | 2.50 | 2.50 |
| Cola Mint flavor | 20.00 | 20.00 | 20.00 | 20.00 | 20.00 | 20.00 |
| Final blend weight | 250.00 | 250.00 | 250.00 | 250.00 | 250.00 | 250.00 |

Nicotine premixes comprise nicotine loaded on calcium silicate (Florite®) with either gluconic acid or citric acid respectively.

A nicotine final blend was made by sifting all the excipients (sorbitol, gum *arabica* and sweetener) separately through 20 mesh and collecting them separately into double-lined polybags. The nicotine premix and sifted excipients were placed into a double cone blender, and mixed for 15 minutes at medium speed. The flavor mix was added to the blender and mixed for 15 minutes at medium speed. The final blend was unloaded into double-lined polybags.

The final blend was filled into heat-sealable nonwoven pouches and sealed properly using a suitable dosing unit. The target filled weight per pouch is 250 mg±10%.

Table 8 shows the characterization of Nicotine Pouches Blend. The data shows that the level of nicotine degradants is either not detectable or below a quantifiable level. This shows that nicotine is present in a stabilised form.

TABLE 8

| | Batch | F1 | G1 | H1 | I1 | J1 | K1 |
|---|---|---|---|---|---|---|---|
| Test | pH | 8.92 | 8.81 | 8.77 | 8.72 | 8.69 | 8.68 |
| | LOD (%) | 9.03 | 4.64 | 9.98 | 7.11 | 8.66 | 5.55 |
| | Assay | | | 95 to 105% | | | |

TABLE 8-continued

| Batch | F1 | G1 | H1 | I1 | J1 | K1 |
|---|---|---|---|---|---|---|
| Nicotine degradants | | | | | | |
| Anabasine (%) | ND | ND | ND | ND | ND | ND |
| Anatabine (%) | ND | ND | ND | ND | ND | ND |
| Beta-Nicotyrine % | ND | ND | ND | ND | ND | ND |
| Cotinine % | BQL | BQL | BQL | BQL | BQL | BQL |
| Myosmine (%) | BQL | BQL | BQL | BQL | BQL | BQL |
| Nicotine N Oxide (%) | BQL | BQL | BQL | BQL | BQL | BQL |
| Nornicotine (%) | BQL | BQL | BQL | BQL | BQL | BQL |

Example 18: Nicotine Pouch Blend Stability Results

Nicotine blend compositions in pouches, with compositions as described in Examples 16 and 17 were stored at 25° ° C. for 4 months. They were then analysed for nicotine degradants, with the results shown in Table 9. The results show very low levels of nicotine degradation.

TABLE 9

| Stability Results at 25° C. for 4 months | | | | | | |
|---|---|---|---|---|---|---|
| Batch No. | A1 | B1 | C1 | D1 | G1 | I1 |
| pH | 8.12 | 8.18 | 8.08 | 8.26 | 8.06 | 8.11 |
| LOD (%) | 11.72 | 5.46 | 10.05 | 3.2 | 3.03 | 4.73 |
| Assay (%) | | | 95 to 105% | | | |
| Nicotine Related substance | | | | | | |
| Anabasine (%) | ND | ND | ND | ND | ND | ND |
| Anatabine (%) | ND | ND | ND | ND | ND | ND |
| Beta-Nicotyrine (%) | ND | ND | ND | ND | ND | ND |
| Cotinine (%) | 0.0016 | 0.0012 | 0.0013 | 0.0012 | 0.0016 | 0.0016 |
| Myosmine (%) | 0.0020 | 0.0012 | 0.0013 | 0.0012 | 0.0016 | 0.0018 |
| Nicotine N Oxide (%) | 0.0046 | 0.0035 | 0.0043 | 0.0048 | 0.0095 | 0.013 |
| Nornicotine (%) | 0.0013 | BQL | BQL | BQL | BQL | BQL |

Example 19: Characterization of Nicotine Release from Nicotine Pouches (In Vivo)

Each batch was evaluated for release characterization of nicotine with three pouches. Users were instructed to place the pouch between their gum and lip for up to 30 minutes or an hour. Table 10 shows the flexibility in the compositions as they can be tailored to provide a required nicotine release profile. Zyn and On are commercially available products. Some of the calcium silicate compositions give a release profile similar to that of the commercial product Zyn (i.e. slow), but some give a release profile similar to that of a different commercial product On, (i.e. faster). Further, the compositions that were treated with $CO_2$ give a very fast release profile. NA means that the nicotine in the sample was used up so fast that it did not reach the measurement window. The compositions of the invention have the advantage of providing a tailored release profile. They achieve this without requiring a soluble buffer agent to modulate the release of nicotine. A disadvantage that the commercial products Zyn and On have is that they contain a soluble buffer agent and the buffer agents confer an undesirable salty taste.

TABLE 10

| Batch No. | Pouch No. | Initial Nicotine Hit (sec) | Saturation (Sec) | Diminished Nicotine (Sec) | Depleted Nicotine/End (Sec) | Flavor level | Flavor long-lasting |
|---|---|---|---|---|---|---|---|
| C1 | 1 | 8 | 14 | NA | 1260 | Good | Yes |
| | 2 | 5 | 14 | NA | 1200 | Good | Yes |
| | 3 | 10 | 14 | NA | 1230 | Good | Yes |
| G1 | 1 | 6 | 12 | 120 | 570 | Good | Yes |
| | 2 | 4 | 12 | 110 | 688 | Good | Yes |
| | 3 | 6 | 12 | 88 | 590 | Good | Yes |
| I1 | 1 | 18 | 24 | NA | 1440 | Good | Yes |
| | 2 | 23 | 20 | NA | 1300 | Good | Yes |
| | 3 | 20 | 24 | NA | 1450 | Good | Yes |
| K1 | 1 | 8 | 25 | 120 | 1260 | Good | Yes |
| | 2 | 12 | 25 | 141 | 1100 | Good | Yes |
| | 3 | 18 | 25 | 135 | 1250 | Good | Yes |
| G1 | 1 | 4 | 8 | NA | NA | Good | Yes |
| | 2 | 6 | 8 | NA | 90 | Good | Yes |
| | 3 | 8 | 10 | NA | 180 | Good | Yes |
| Y1 | 1 | 12 | 20 | 600 | 1140 | Good | Yes |
| | 2 | 15 | 24 | 564 | 1200 | Good | Yes |
| | 3 | 12 | 22 | 575 | 1175 | Good | Yes |
| AA4 | 1 | 4 | 80 | NA | 138 | Good | Yes |
| | 2 | 3 | 66 | NA | 87 | Good | Yes |
| | 3 | 4 | 85 | NA | 100 | Good | Yes |
| AA6 | 1 | 2 | 78 | NA | 183 | Good | Yes |
| | 2 | 3 | 80 | NA | 258 | Good | Yes |
| | 3 | 4 | 75 | NA | 198 | Good | Yes |
| Zyn 6 mg | 1 | 8 | 24 | NA | 1440 | Low | yes |
| | 2 | 12 | 30 | NA | 1320 | Low | yes |
| | 3 | 10 | 45 | NA | 1380 | Low | yes |
| On 8 mg | 1 | 6 | 15 | 312 | 378 | Good | Yes |
| | 2 | 8 | 14 | 300 | 395 | Good | Yes |
| | 3 | 10 | 15 | 326 | 405 | Good | Yes |

Table 10A shows Y1 Formulation details. Table 13 shows the AA4 and AA6 formulation details.

TABLE 10A

| | mg/unit |
|---|---|
| 4 mg Granulation | |
| Nicotine premix (S2 citric acid) 4 mg equivalent | 16.00 |
| Microcrystalline cellulose 102 | 229 |
| hydroxypropyl methyl cellulose (low viscosity); | 5.00 |
| Granulation stage weight | 250.00 |
| 8 mg Final Blend - Batch 076 | |
| Granules (4 mg equivalent from ZNP/SYN/021) | 250.00 |
| Extra nicotine from premix - 4 mg equivalent | 16.00 |
| Sorbitol | 56.50 |
| Gum arabica | 5.00 |
| Sweetener | 2.50 |
| Citrus mint (flavor mix) | 20.00 |
| Final granules weight | 350.00 |

Example 20: Extraction Data

The release of nicotine from a non-woven pouch was analysed using either water or artificial saliva. 20 g of water or artificial saliva was put into a petri dish and filter paper was placed on top. The pouch was placed on top of the filter paper and left for 5 minutes. The pouch was then removed and the concentration of the nicotine in the water or artificial saliva was measured to calculate the amount of nicotine that was dissolved. Greater release of nicotine was seen when artificial saliva was used. The free flowing powder composition G1 showed a higher release than the granulated composition C1. This shows that the composition can be formulated to give either a fast or slow release of nicotine.

TABLE 11

| | | | |
|---|---|---|---|
| Composition 'G1' (direct) | 250 mg pouch equal to 6 mg | Nicotine dissolved in 20 grams of water (%) | 79% |
| Composition 'C1' (granulation) | 250 mg pouch equal to 6 mg | Nicotine dissolved in 20 grams of water (%) | 40% |
| Composition 'G1' (direct) | 250 mg pouch equal to 6 mg | Nicotine dissolved in 20 grams of artificial saliva (%) | 94% |

Example 21: Nicotine Premix Stability Results with Three Strategies at Different Storage Conditions The data in Table 12 shows that nicotine has greater stability over time when citric acid or gluconic acid are used, compared with glycerol. This is expected to be due to the formation of nicotine salts when either gluconic acid or citric acid are used.

TABLE 12

| | Formulation Strategy | | | | | | | | |
|---|---|---|---|---|---|---|---|---|---|
| | Nicotine premix S3 (Nicotine loaded on calcium silicate (Florite ®) with Glycerol) | | | Nicotine premix S2 (Nicotine loaded on calcium silicate (Florite ®) with citric acid) | | | Nicotine premix S1 (Nicotine loaded on calcium silicate (Florite ®) with gluconic acid) | | |
| Time interval | Initial | 3 months @ 25° C. | 3 months @ 40° C. | Initial | 3 months @ 25° C. | 3 months @ 40° C. | Initial | 3 months @ 25° C. | 3 months @ 40° C. |
| pH | 9.94 | 9.18 | 8.99 | 7.44 | 7.88 | 9.13 | 7.77 | 7.97 | 8.33 |
| LOD ( %) | 56.69 | 4.65 | 4.45 | 49.06 | 23.85 | 24.19 | 40.95 | 29.74 | 30.12 |
| Description | White powder | yellow colour powder | Dark yellow colour powder | White powder | White powder | White powder | White powder | White powder | White powder |
| Nicotine Related substance | | | | | | | | | |
| Anabasine NMT 0.3% (%) | ND | ND | ND | ND | ND | ND | ND | ND | ND |
| Anatabine NMT 0.3% (%) | ND | ND | ND | ND | ND | ND | ND | ND | ND |
| Beta-Nicotyrine NMT 0.3% | ND | 0.041 | 0.096 | ND | ND | ND | ND | ND | ND |
| Cotinine NMT 0.3% (%) | 0.026 | 0.038 | 0.52 | 0.014 | 0.015 | 0.018 | 0.024 | 0.0078 | 0.0089 |
| Myosmine NMT 0.3% (%) | 0.048 | 0.036 | 0.31 | 0.010 | 0.016 | 0.021 | 0.056 | 0.0088 | 0.0083 |
| Nicotine N Oxide NMT 0.3% | 0.012 | 5.32 | 8.99 | BQL | 0.011 | 0.13 | 0.016 | 0.016 | 0.42 |
| Nornicotine NMT 0.3% | 0.008 | 0.025 | 0.021 | BQL | BQL | 0.022 | 0.009 | 0.0029 | 0.015 |

Example 22: Stability Data for Compositions with and without Treatment with Carbon Dioxide Table 13 below shows the compositions. Initial compositions AA1-AA6 according to Table 13 were held overnight under 4-5 bar pressure of carbon dioxide created through the addition of dry ice, the pressure released. In experiments, AA1-AA4 and AA6 the nicotine was absent from the initial composition and added instead after the carbon dioxide treatment. Compositions AA18-AA23 did not have any carbon dioxide treatment. For all the experiments the amounts of calcium silicate (Tomita Florite® PS-200 grade) and nicotine were each 20 grams. After 4-5 days, the resulting compositions were observed for colour and tested for the nicotine degradant levels as a measure of oxidative degradation. Certain compositions also included either water, ethanol or glycerol.

The resulting compositions were tested a few days later for colour and for the level of nicotine-N-oxide as representative of the amount of oxidative degradation of the nicotine. The best performing samples were when the compositions were pretreated with carbon dioxide and additionally included one of either water, ethanol or glycerol, and when the nicotine was added after the carbon dioxide treatment.

The data further shows a low level of nicotine degradants which indicates that nicotine is stabilised by the compositions. Batch AA1 was yellow and batches AA2 to AA6 were white. This shows an advantage of using water, ethanol or glycerol in the batches is that there is less degradation of nicotine.

TABLE 13

| Batch. No | | AA1 | AA2 | AA3 | AA4 | AA5 |
|---|---|---|---|---|---|---|
| Ingredients | Calcium Silicate Florite PS 200 (g) | 20 | 20 | 20 | 20 | 20 |
| | Water (g) | 0 | 10 | 0 | 0 | 10 |
| | Ethanol (g) | 0 | 0 | 10 | 0 | 0 |
| | Glycerol (g) | 0 | 0 | 0 | 10 | 0 |
| | CO2 pressure (Bar) | 4 to 5 | 4 to 5 | 4 to 5 | 4 to 5 | 4 to 5 |
| | Nicotine (g) | 20* | 20* | 20* | 20* | 20 |
| Testing | Purity (Assay) | 94.08 | 103.35 | 105.65 | 102.35 | 103.98 |
| | pH (1 g in 15 ml water) | 9.57 | 9.91 | 9.63 | 9.70 | 9.56 |
| | pH (overnight expose) | 9.67 | 9.87 | 9.66 | 9.70 | 9.58 |
| | Anabasine (%) | ND | ND | ND | ND | ND |
| | Anatabine (%) | ND | ND | ND | ND | ND |
| | Beta Nicotyrine (%) | ND | ND | ND | ND | ND |
| | Cotinine (%) | 0.0386 | BQL | 0.0118 | 0.0100 | BQL |
| | Myosmine (%) | 0.0902 | 0.0316 | 0.0340 | 0.0350 | 0.0296 |
| | Nicotine N oxide (%) | 0.4620 | BQL | 0.0714 | 0.0436 | BQL |
| | Nornicotine (%) | BQL | BQL | BQL | BQL | BQL |

| Batch. No | | AA6 | AA18 | AA19 | AA20 | AA21 | AA22 | AA23 |
|---|---|---|---|---|---|---|---|---|
| Ingredients | Calcium Silicate Florite PS 200 (g) | 20 | 20 | 20 | 20 | 20 | 20 | 20 |
| | Water (g) | 10 | 0 | 10 | 0 | 0 | 10 | 10 |
| | Ethanol (g) | 0 | 0 | 0 | 10 | 0 | 0 | 0 |
| | Glycerol (g) | 0 | 0 | 0 | 0 | 10 | 0 | 0 |
| | CO2 pressure (Bar) | 4 to 5 | | | No CO2 | | | |
| | Nicotine (g) | 20* | 20 | 20 | 20 | 20 | 20 | 20 |
| Testing | Purity (Assay) | 101.13 | 92.92 | 104.13 | 104.68 | 99.08 | 109.15 | 106.60 |
| | pH (1 g in 15 ml water) | 9.64 | 9.96 | 10.12 | 9.99 | 9.95 | 9.96 | 10.05 |
| | pH (overnight expose) | 9.65 | 9.91 | 10.05 | 9.94 | 9.83 | 9.87 | 9.83 |
| | Anabasine (%) | ND | ND | ND | ND | ND | ND | ND |
| | Anatabine (%) | ND | ND | ND | ND | ND | ND | ND |
| | Beta Nicotyrine (%) | ND | 0.011 | ND | 0.012 | 0.016 | ND | ND |
| | Cotinine (%) | BQL | 0.43 | 0.011 | 0.011 | 0.12 | 0.013 | 0.013 |
| | Myosmine (%) | BQL | 0.39 | 0.038 | 0.12 | 0.14 | 0.038 | 0.036 |
| | Nicotine N oxide (%) | BQL | 1.75 | 0.016 | 1.44 | 1.31 | 0.016 | 0.015 |
| | Nornicotine (%) | BQL | 0.011 | BQL | BQL | 0.011 | BQL | BQL |

TABLE 14

| Impurity profile | | | | | | |
|---|---|---|---|---|---|---|
| Batches without CO2 | AA18 | AA19 | AA20 | AA21 | AA22 | AA23 |
| Batched with CO2 | AA1 | AA2 | AA3 | AA4 | AA5 | AA6 |
| Cotinine, without CO2 | 0.430 | 0.011 | 0.011 | 0.120 | 0.013 | 0.013 |
| Cotinine, with CO2 | 0.039 | BQL | 0.012 | 0.010 | BQL | BQL |
| Myosmine, without CO2 | 0.390 | 0.038 | 0.120 | 0.140 | 0.038 | 0.036 |
| Mysomine, with CO2 | 0.090 | 0.032 | 0.034 | 0.035 | 0.030 | BQL |
| Nicotine-N-oxide, without CO2 | 1.750 | 0.016 | 1.440 | 1.310 | 0.016 | 0.015 |
| Nicotine-N-oxide, with CO2 | 0.462 | BQL | 0.071 | 0.044 | BQL | BQL |

Table 14 shows the nicotine degradants and compares premix compositions with and without treatment with carbon dioxide. The data shows that treatment with carbon dioxide reduces the overall level of nicotine degradants which indicates that nicotine has been stabilised. Further, the inclusion of water in the premix composition further stabilises nicotine.

Example 23. Further Measurements of Oxidative Degradation of Nicotine Supported on Various Calcium Silicates Measurements of impurities from oxidative degradation of the nicotine supported on calcium silicate are shown in Table 15. This shows that different forms of calcium silicate can be used in the present invention. Measurement of impurities from oxidative degradation of the nicotine supported on various calcium silicate materials with stabilisation by citric acid or gluconic acid were made. The calcium silicate materials were Tomita Florite®-PS-200, Tomite Florite®-R grade, Evonik Zeofree® 250, and MLA Industries Hydrated Calcium Silicate. Up to 6 months after the preparation of the composition, only a couple of samples revealed cotinine present at 0.02% relative to the nicotine. Surprisingly myosmine impurity measured in the nicotine reduced in several of the samples from an initial 0.14% to being in the range of 0.04-0.12%.

TABLE 15

| Composition | After Time Period | Impurities/Observation |
|---|---|---|
| 25% nicotine with citric acid on Tomita Florite ®-R | 4 months | Cotinine 0.02%, Myosmine reduced from the initial 0.14% to 0.09% |
| 25% nicotine with citric acid on Tomita Florite ®-PS-200 | 4 months | Cotinine 0.02%. Myosmine reduced from the initial 0.14% to 0.07% |
| 25% nicotine with 25% citric acid on Evonik Zeofree ® 250 calcium silicate | 1 month | No oxidative impurities seen. Myosmine remained at 0.14% |
| 25% nicotine with 25% citric acid on MLA Industries calcium silicate | 6 months | No oxidative impurities seen. Myosmine remained at 0.14% |
| 25% nicotine with 25% citric acid on Tomita Florite ®-R | 6 months | No oxidative impurities seen. Myosmine 0.04% |
| 25% nicotine with 25% citric acid on Tomita Florite ®-PS200 | 6 months | No oxidative impurities seen. Myosmine 0.04% |
| 25% nicotine with 10% gluconic acid on Evonik Zeofree ® 250 calcium silicate | 6 months | No oxidative impurities seen. Myosmine reduced from 0.14% to 0.12% |
| 25% nicotine with 10% gluconic acid on MLA Industries calcium silicate | 6 months | No oxidative impurities seen. Myosmine reduced from 0.14% to 0.12% |
| 25% nicotine with 10% gluconic acid on Tomita Florite ®-R | 6 months | No oxidative impurities seen. Myosmine reduced from 0.14% to 0.06% |
| 25% nicotine with 10% gluconic acid on Tomita Florite ®-PS200 | 6 months | No oxidative impurities seen. Myosmine reduced from 0.14% |

Example 24. Heat-not-Burn Composition

A composition was made by mixing S-nicotine (synthetic) (1.0 g), 50% aqueous gluconic acid (5.0 g), calcium silicate (Florite® PS-200 grade, 3.0 g), glycerol and tobacco flavouring (0.1 g). A sample of 250-300 mg containing 10-12 mg nicotine was introduced into the pod of a PODA vaporiser heat-not-burn device (podalifestyle.com) and tested. Upon inhalation with a medium temperature setting a strong sensation was from the nicotine was experienced.

Example 25 Composition of Nicotine Lozenges by Direct Blending and Compression Process Table 16 shows the nicotine premix compositions used.

TABLE 16

| Nicotine premix Citric acid | % Composition | 6 mg | 4 mg | 2 mg |
|---|---|---|---|---|
| Nicotine | 25 | 6 | 4 | 2 |
| Citric acid | 15 | 4 | 2 | 1 |
| Water | 22 | 5 | 4 | 2 |
| Florite PS 200 | 38 | 9 | 6 | 3 |
| | 100 | 24 | 16 | 8 |

Nicotine Lozenges Preparation Procedure:

Step 1 (Sifting): Sifted all the excipients separately through 20 mesh and collected them into double-lined polybags.

Step 2 Blending 1: Loaded sifted Mannitol 200 SD, Sorbitol, Xanthan gum, HPMC, and Nicotine premix 25% into a double cone blender and mixed for 15 minutes at medium speed.

Step 2 Blending 2: Loaded sifted colloidal silicon dioxide, Aspartame, taste-masking agents, and flavors into the above step and mixed for 20 min at 12 RPM in an octagonal blender along with step 2 materials.

Step 3 Lubrication: Loaded the lubricant into the above step and mixed for 5 minutes at medium speed. Unload the final blend into double-lined polybags.

Step 4: Compression: Compressed the lubricated blend using respective punches.

Table 17 shows the formulations used.

TABLE 17

| | Amount | AB | | BB | | CB | | DB | |
|---|---|---|---|---|---|---|---|---|---|
| Ingredient | of nicotine per lozenge | 4 mg | % w/w | 2 mg | % w/w | 4 mg | % w/w | 2 mg | % w/w |
| Mannitol (Pearlitol 200 SD) | Diluent | 433.85 | 57.85 | 439.45 | 58.59 | 134.67 | 53.87 | 140.28 | 56.11 |
| Sorbitol | Diluent | 185.94 | 24.79 | 188.34 | 25.11 | 57.74 | 23.10 | 60.13 | 24.05 |
| Xanthan gum (Xantural 75) | Dissolution modifier | 15.00 | 2.00 | 15.00 | 2.00 | 5.00 | 2.00 | 5.00 | 2.00 |

TABLE 17-continued

| Ingredient | Amount of nicotine per lozenge | AB 4 mg | AB % w/w | BB 2 mg | BB % w/w | CB 4 mg | CB % w/w | DB 2 mg | DB % w/w |
|---|---|---|---|---|---|---|---|---|---|
| Methocel | Binder | 56.25 | 7.50 | 56.25 | 7.50 | 18.75 | 7.50 | 18.75 | 7.50 |
| Nicotine premix 25% | Active | 16.00 | 2.13 | 8.00 | 1.07 | 16.00 | 6.40 | 8.00 | 3.20 |
| Colloidal silicon | Glidant | 4.09 | 0.55 | 4.09 | 0.55 | 1.25 | 0.50 | 1.25 | 0.50 |
| Aspartame | Sweetener | 4.09 | 0.55 | 4.09 | 0.55 | 4.09 | 1.64 | 4.09 | 1.64 |
| Spearmint | Flavor | 10.23 | 1.36 | 10.23 | 1.36 | 3.75 | 1.50 | 3.75 | 1.50 |
| Taste-masking | Flavor | 17.05 | 2.27 | 17.05 | 2.27 | 6.25 | 2.50 | 6.25 | 2.50 |
| Magnesium stearate | Lubricant | 7.50 | 1.00 | 7.50 | 1.00 | 2.50 | 1.00 | 2.50 | 1.00 |
| Total weight (mg) or % | | 750.00 | 100.0 | 750.00 | 100.0 | 250.00 | 100.0 | 250.00 | 100.0 |
| Nicotine % (consider premix weight) | | 2.13 | | 1.07 | | 6.40 | | 3.20 | |
| Nicotine % (consider Nicotine level) | | 0.53 | | 0.27 | | 1.60 | | 0.80 | |

Example 26 Composition of Nicotine Lozenges by Using Wet Granulation, Blending, and Compression Process Table 16 shows the nicotine premix compositions used.

Nicotine lozenges Preparation Procedure:

Binder Preparation

Step 1: The weighted quantity of purified water was transferred into a glass vessel, placed in the stirrer in the center of the glass vessel, and stirred at optimum RPM. Gradually added weighed amount of binder to the above step and mixed well until lumps free translucent solution.

Granulation

Step 2: Weighed quantity of Nicotine premix, mannitol, Xanthan gum, and HPMC Dry binder loaded into the planetary mixer and mixed for 15 minutes at medium speed.

Step 3: Gradually added step 1 granulation solution to step 2 using a peristaltic pump with an additional rate of 2 to 4 grams per minute and granulated at medium speed. Continue mixing until the granulation endpoint is achieved.

Step 4: After achieving the granulation endpoint, the granulation was sieved and placed on a tray for the drying process. The granules were dried at 50° C. by using fluidized air and targeted LOD NMT 3.0%

Step 5: Screen the dried granules through the #20 mesh screen and collect #20 retentions for milling. Mill the retention granules using a Multi mill fitted with a 1.5 mm screen and sift the milled granules through the #20 mesh screen.

Blending and Lubrication

Step 1 (Sifting): Sifted all the excipients separately through 20 mesh and collected them into double-lined polybags.

Step 2 (Blending 1): Loaded the Drug granules, sifted excipients (silicon dioxide, Acesulfame potassium, taste-masking agents, and flavors) were of step 1 into a double cone blender mixed for 30 minutes at 12 RPM.

Step 3 (Blending 2): Loaded the lubricant magnesium stearate mix into the above step and mixed for 5 minutes at 12 RPM. Unload the final blend into double-lined polybags.

Compression: Compressed the lubricated blend using respective punches.

Table 18 shows the formulations used.

TABLE 18

| Ingredient | Amount of nicotine per lozenge | EB 4 mg | FB 2 mg | GB 4 mg | HB 2 mg |
|---|---|---|---|---|---|
| Intra granular | | | | | |
| Nicotine premix * | Active | 16.00 | 8.00 | 16.00 | 16.00 |
| HPMC (Dry Binder) | Binder | 42.00 | 42.00 | 12.50 | 12.50 |
| Mannitol | Diluent | 573.50 | 581.50 | 184.00 | 184.00 |
| Xanthan gum NF | Dissolution modifier | 24.00 | 24.00 | 7.50 | 7.50 |
| Binder solution | | | | | |
| HPMC | Binder | 22.50 | 22.50 | 7.50 | 7.50 |
| Purified Water | | qs | qs | qs | qs |
| Extra Granular | | | | | |
| Acesulfame potassium | Sweetener | 6.00 | 6.00 | 1.88 | 1.88 |
| colloidal silicon dioxide | Glidant | 6.00 | 6.00 | 1.88 | 1.88 |
| Taste masking agent | Flavor | 18.00 | 18.00 | 6.25 | 6.25 |
| Peppermint flavor premix | Flavor | 18.00 | 18.00 | 6.25 | 6.25 |
| Magnesium stearate | Lubricant | 24.00 | 24.00 | 6.25 | 6.25 |
| Total weight (mg) | | 750.00 | 750.00 | 250.00 | 250.00 |

TABLE 18-continued

| Ingredient | Amount of nicotine per lozenge | EB 4 mg | FB 2 mg | GB 4 mg | HB 2 mg |
|---|---|---|---|---|---|
| Nicotine % (consider premix weight) | | 2.13 | 1.07 | 6.40 | 3.20 |
| Nicotine % (consider Nicotine level) | | 0.53 | 0.27 | 1.60 | 0.80 |

Example 27 Preparation of Chewing Gum Comprising Nicotine Premix

Table 16 shows the nicotine premix compositions used.

Nicotine Chewing Gum Preparation Procedure:

Step 1 (Sifting): Sifted all the excipients separately through 20 mesh and collected them into double-lined polybags.

Step 2 Blending 1: Loaded sifted gum base granules flavor premix, sorbitol, sweeteners, and Nicotine premix into a double cone blender and mixed for 15 minutes at medium speed.

Step 2 Blending 2: Loaded, sifted colloidal silicon dioxide into the above step and mixed for 10 min at 12 RPM in an octagonal blender along with step 2 materials.

Step 3 Lubrication: Loaded the lubricant into the above step and mixed for 5 minutes at medium speed. Unload the final blend into double-lined polybags.

Compression: Compressed the lubricated gum base granules using 14.5 mm×13.5 mm rectangle punches.

Table 19 shows the formulations used.

TABLE 19

| Ingredient | Function | QB 4 mg (mg/Gum) | RB 2 mg (mg/Gum) |
|---|---|---|---|
| Gum Base granules | Gum base | 854.00 | 862.00 |
| Sorbitol | Diluent | 75.00 | 75.00 |
| Nicotine Premix | Diluent | 16.00 | 8.00 |
| Colloidal silicon dioxide | Glidant | 10.00 | 10.00 |
| Flavor premix | Flavor | 10.00 | 10.00 |
| Liquid flavor | Flavor | 10.00 | 10.00 |
| intensive sweeteners | Sweetener | 10.00 | 10.00 |
| Magnesium stearate | Lubricant | 15.00 | 15.00 |
| Total | | 1000.00 | 1000.00 |
| Nicotine % (consider premix weight) | | 1.6 | 0.8 |
| Nicotine % (consider Nicotine level) | | 0.4 | 0.2 |

Example 28 Preparation of Nicotine Chewing Gum Process Covers a Core Gum, Sub Coating, and Crunchy Sugar Coating Table 16 shows the nicotine premix compositions used.

Process: Core chewing gum preparation process same as example QB and sub coating and sugar coating process as per standard sugar coating procedure.

Table 20 shows the formulations used.

TABLE 20

| Ingredient | Function | 4 mg (mg/Gum) | 2 mg (mg/Gum) |
|---|---|---|---|
| Core gum | | | |
| Gum Base granules | Gum base | 854.00 | 862.00 |
| Sorbitol | Diluent | 75.00 | 75.00 |
| Nicotine Premix | Diluent | 16.00 | 8.00 |
| Colloidal silicon dioxide | Glidant | 10.00 | 10.00 |
| Flavor premix | Flavor | 10.00 | 10.00 |
| Liquid flavor | Flavor | 10.00 | 10.00 |
| Acesulfame potassium | Sweetener | 10.00 | 10.00 |
| Magnesium stearate | Lubricant | 15.00 | 15.00 |
| Core stage weight (mg) | | 1000.00 | 1000.00 |
| Sub coating | | | |
| HPMC | Binder | 40.00 | 40.00 |
| Sucralose | Sweetener | 2.50 | 2.50 |
| Polysorbate 80 | plasticizer | 2.50 | 2.50 |
| Flavor | Flavor | 5.00 | 5.00 |
| Purified water | solvent | qs | qs |
| Sub coating stage weight (mg) | | 1050.000 | 1050.00 |
| Hard, crunchy coating | | | |
| Xylitol | Coating sugar | 386.25 | 386.25 |
| Gum arabica | Binder | 15.00 | 15.00 |
| Titanium dioxide | coloring agent | 11.25 | 11.25 |
| Winter fresh | Flavor | 30.00 | 30.00 |
| Carnauba wax | Surface polisher | 7.50 | 7.50 |
| Purified water | Solvent | q.5 | q.5 |
| Final coated chewing gum weight (mg) | | 1500.00 | 1500.00 |
| Nicotine % (consider premix weight) | | 1.07 | 0.27 |
| Nicotine % (consider Nicotine level) | | 0.53 | 0.13 |

The invention claimed is:

1. A premix composition comprising calcium silicate in a range of 20 wt % to 60 wt % and nicotine in a range of 10 wt % to 60 wt %, wherein the amount of nicotine is present as nicotine and/or an equivalent amount of nicotine provided as a nicotine salt.

2. A premix composition according to claim 1, wherein the ratio of nicotine, and/or nicotine salt to calcium silicate by weight is in the range of 5%:95% to 75%:25%, wherein the amount of nicotine is present as nicotine and/or an equivalent amount of nicotine provided as a nicotine salt.

3. A premix composition according to claim 1 further comprising water.

4. A premix composition according to claim 1, wherein the premix composition further comprises an acid, ethanol, glycerol or any combination thereof.

5. A premix composition according to claim 4, wherein the acid is selected from the group consisting of pyruvic acid, benzoic acid, levulinic acid, citric acid, gluconic acid, glucuronic acid, ribonic acid, arabinonic acid or galactonic acid.

6. A premix composition according to claim 1, wherein a form of administration is selected from: pouch, a heat-not-burn device, patch, a lozenge, a troche, a pill, a capsule, a tablet or a chewing gum.

7. A method for preparing a premix composition comprising mixing calcium silicate in a range of 20 wt % to 60 wt % calcium silicate and nicotine in a range of 10 wt % to 60 wt %, wherein the amount of nicotine is present as nicotine and/or an equivalent amount of nicotine provided as a nicotine salt.

8. A method according to claim 7, wherein the method further comprises mixing the nicotine and/or a nicotine salt with an acid, ethanol, carbon dioxide, glycerol or a combination thereof to form a solution before mixing the solution with the calcium silicate.

9. A method according to claim 7, the method further comprising mixing in water.

10. A method according to claim 9, wherein 5 wt % to 30 wt % water is mixed in.

11. A method according to claim 8, wherein the nicotine and/or a nicotine salt is mixed with carbon dioxide and, optionally, an acid, ethanol, glycerol or a combination thereof to form a solution before mixing the solution with the calcium silicate.

12. A method according to claim 11, wherein the solution is homogenous before mixing with calcium silicate.

13. A method according to claim 11, wherein the solution is introduced to the calcium silicate incrementally.

14. A method according to claim 11, wherein mixing continues until a free-flowing powder is prepared.

* * * * *